United States Patent

Aoki

[11] Patent Number: 5,440,432
[45] Date of Patent: Aug. 8, 1995

[54] DUBBING SYSTEM FOR DIGITAL INFORMATION

[75] Inventor: Akio Aoki, Tokyo, Japan

[73] Assignee: Canon Kabushiki Kaisha, Tokyo, Japan

[21] Appl. No.: 209,378

[22] Filed: Mar. 14, 1994

Related U.S. Application Data

[63] Continuation of Ser. No. 113,188, Aug. 30, 1993, abandoned, which is a continuation of Ser. No. 658,402, Feb. 20, 1991, Pat. No. 5,267,094.

[30] Foreign Application Priority Data

Feb. 20, 1990 [JP] Japan .................................. 2-40236

[51] Int. Cl.⁶ ........................... G11B 5/00; G11B 5/86
[52] U.S. Cl. ........................................ 360/32; 360/15; 360/61; 348/469
[58] Field of Search ................ 360/32, 10.3, 33.1, 360/0.51, 70, 38.1, 48, 74.1, 15, 61, 60; 358/310, 21 R, 36, 37, 84, 147, 141, 133, 335

[56] References Cited

U.S. PATENT DOCUMENTS 4,329,708  5/1982  Yamamoto et al. ............ 360/38.1 X
5,267,094 11/1993  Aoki ................................... 360/32

Primary Examiner—Ali Neyzari
Attorney, Agent, or Firm—Fitzpatrick, Cella, Harper & Scinto

[57] ABSTRACT

In an information processor, code errors in a compressed information code train with an added error correction code are corrected using the error correction code. The error corrected compressed information code train is decoded using decoding corresponding to the compression encoding and an information code included in the information code train that is uncorrectable using the error correction code is produced. The compressed information code train inputted to the decoder and the produced information code train are output. The outputted produced information code train is converted into analog data which is output.

18 Claims, 4 Drawing Sheets

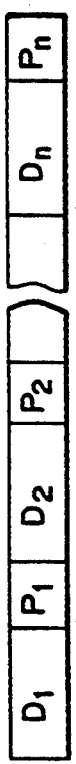
FIG. 3A SIGNAL 46
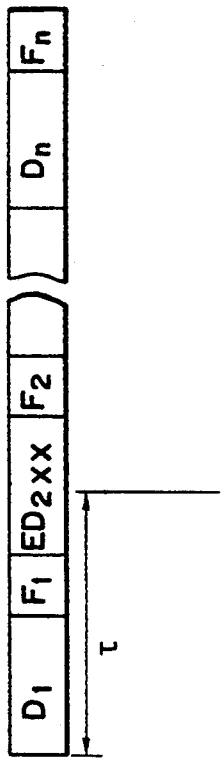
FIG. 3B SIGNAL 48
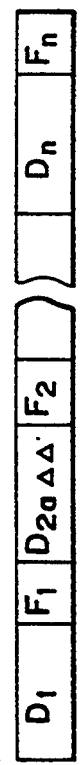
FIG. 3C SIGNAL 54
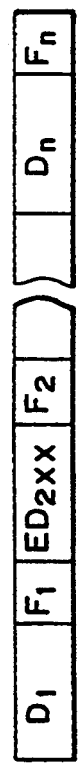
FIG. 3D SIGNAL 58
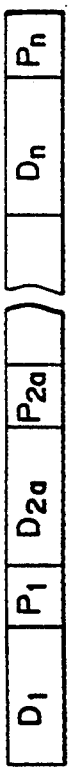
FIG. 3E SIGNAL 56

DUBBING SYSTEM FOR DIGITAL INFORMATION

This application is a continuation of application Ser. No. 08/113,188 filed Aug. 30, 1993 now abandoned, which is a continuation of application Ser. No. 07/658,402 filed Feb. 20, 1991, issued as U.S. Pat. No. 5,267,094, Nov. 20, 1993.

BACKGROUND OF THE INVENTION

1. Field of the Invention

The present invention relates to a dubbing system, and more particularly to a dubbing system for dubbing a digital information code train whose information has been compressed by highly efficient coding and to which an error correction code has been added.

2. Related Background Art

Attention has been recently paid to digital VTRs and digital audio tape recorders (DAT) having no deterioration during dubbing.

A common structure of a dubbing system using two digital VTRs is shown in FIG. 1. In this figure, S represents a slave VTR (on the recording side), and M represents a master VTR (on the reproducing side). For the purpose of simplicity, only the reproducing system of the master VTR (M) and the recording system of the slave VTR (S) are shown in FIG. 1.

In the master VTR (M), a recorded signal of a magnetic tape T1 is converted into an electrical signal by a magnetic head 26, and amplified by a reproducing amplifier 28.

An output of the reproducing amplifier 28 is demodulated by a digital demodulator (not shown), and thereafter applied to an ECC decoder 30. The ECC decoder 30 corrects a code error code generated during reproducing, by using an error correction code contained in the recorded information code train. An output of the ECC decoder 30 is supplied to an expansion circuit 32 whereat it is subjected to a process opposite to that at the time of encoding, i.e., bandwidth expansion and decoding. The output of the ECC decoder is an information code (image code) bandwidth-compressed and encoded. An output of the expansion circuit 32 is supplied to a concealment circuit 34 which conceals a reproduced code error beyond the correction capability of the ECC decoder 30, by means of a process such as interpolation using image correlation. A D/A converter 36 converts an output of the concealment circuit 34 into an analog signal which is then outputted from an output terminal 38. An output of the concealment circuit 34 is supplied to a dubbing output terminal 35.

In the slave VTR (S), a video signal inputted to an input terminal 10 is converted by an A/D converter into a digital signal which is supplied via an N contact of a switch 14 to a bandwidth compression encoding circuit 16. An ECC encoder 18 generates an error correction code for correcting a code error generated at the time of reproducing, and adds a so-called check bit to the bandwidth-compressed and encoded signal from the bandwidth compression encoding circuit 16. An output of the ECC encoder 18 is modulated by a digital modulator (not shown), and thereafter amplified by a recording amplifier 20 to be magnetically recorded on a magnetic tape T2 by a magnetic head 22.

During dubbing, an output of the concealment circuit 34 of the master VTR (M) is inputted via the terminal 35 to the dubbing input terminal 37 of the slave VTR (S). This connection is made so as to dub an error code data when a code error that cannot be corrected is generated in a reproduced information code data. The concealed information code train is therefore inputted to the terminal 37. The concealed code data is applied to the compression encoding circuit 16 to be subjected again to the compression encoding process, and thereafter magnetically recorded on the magnetic tape T2.

A digital VTR is not influenced by distortions on the electromagnetic conversion system, contrary to the case of an analog VTR. Therefore, image deterioration is caused only by bandwidth compression and error concealment, the latter being executed when a number of errors are generated. Further, deterioration caused by distortions on the electromagnetic conversion system of a digital VTR will not be accumulated during dubbing, which is advantageous over an analog VTR.

However, in the above-described conventional system, there is a problem of image deterioration caused by repetitive compressions and expansions if dubbing is repeated many times, because a concealed output from the concealment circuit 34 is supplied to the D contact of the switch 14 and compressed again to magnetically record it.

SUMMARY OF THE INVENTION

It is therefore an object of this invention to provide a dubbing system solving the above-described problem.

It is another object of this invention to provide a dubbing system capable of minimizing information deterioration to be caused by subjecting the data from the concealment circuit again to compression and encoding during dubbing.

In view of the above objects, according to an embodiment of this invention, there is provided a dubbing system including a receiver and a transmitter, comprising:

(a) receiving means for receiving from a transmission line a compressed information code train, the compressed information code train having been compressed in information by compression encoding and having added thereto an error correction code;

(b) error correcting means for correcting a code error in the compressed information code train received by the receiving means, by using the error correction code;

(c) expanding means for expanding the information of the compressed information code train outputted from the error correcting means, by means of decoding corresponding to the compression encoding;

(d) error concealing means for concealing an information code within an information code train outputted from the expanding means, by using correlation of the information, the information code being uncorrectable by the error correcting means;

(e) compressing means for again compression encoding an information code train outputted from the error concealing means;

(f) switching means for outputting an information code train outputted from the compressing means, for the uncorrectable information code and outputting a compressed information code train to be inputted to the expanding means, for the other information codes; and (g) transmitting means for transmitting the information code train outputted from the switching means to another transmission line different from the transmission line from which the compressed code information train is received.

The other objects and advantages of the present invention will become apparent from the following detailed description of the embodiments when read in conjunction with the accompanying drawings.

BRIEF DESCRIPTION OF THE DRAWINGS

FIGS. 3A to 3E are schematic diagrams showing the state of code trains at various circuit portions shown in FIG. 2.

DETAILED DESCRIPTION OF PREFERRED EMBODIMENTS

The embodiments of this invention will be described with reference to the accompanying drawings.

Figure 1:
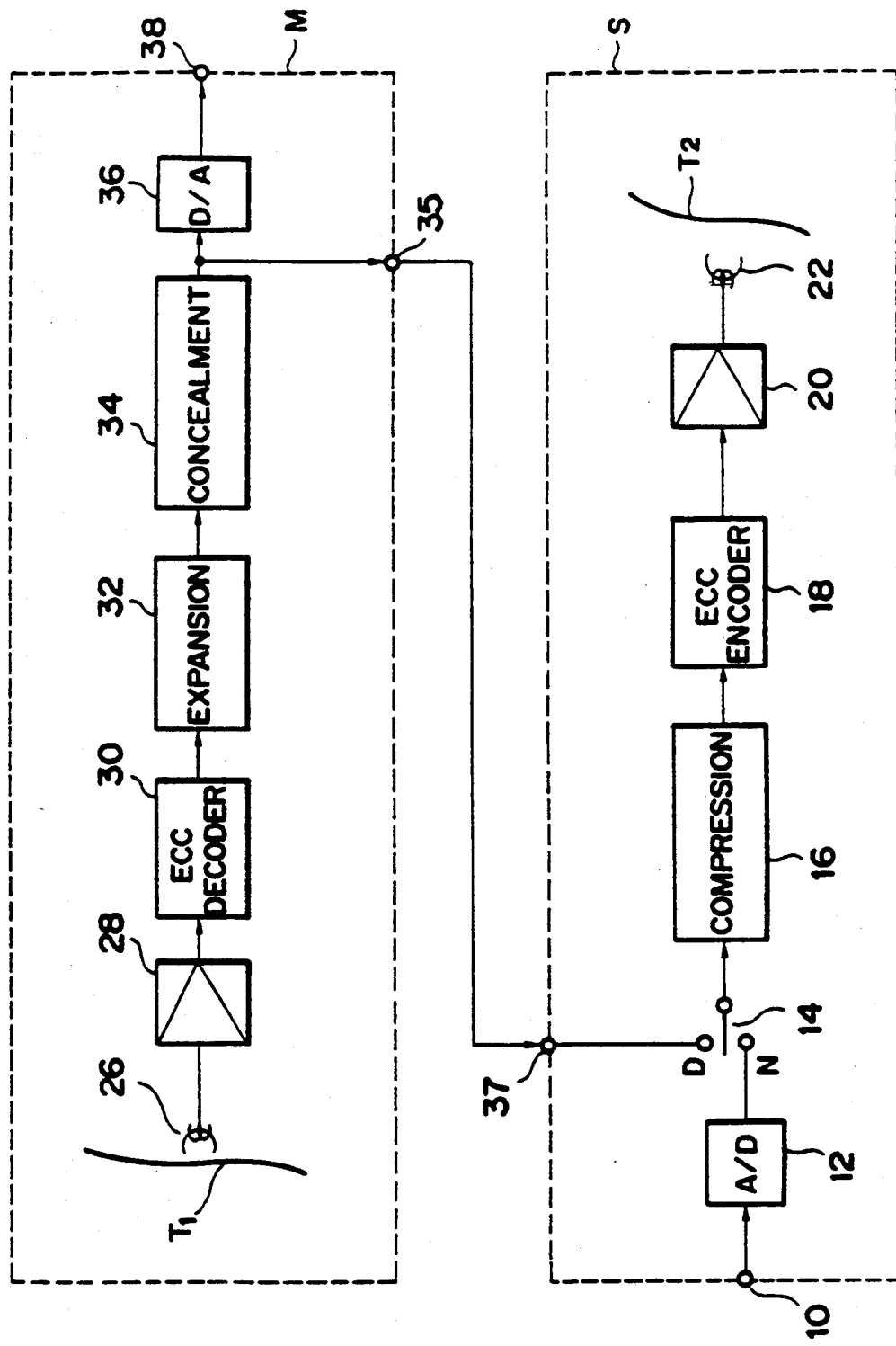
FIG. 1 is a block diagram showing an example of the structure of a conventional dubbing system.
Figure 2:
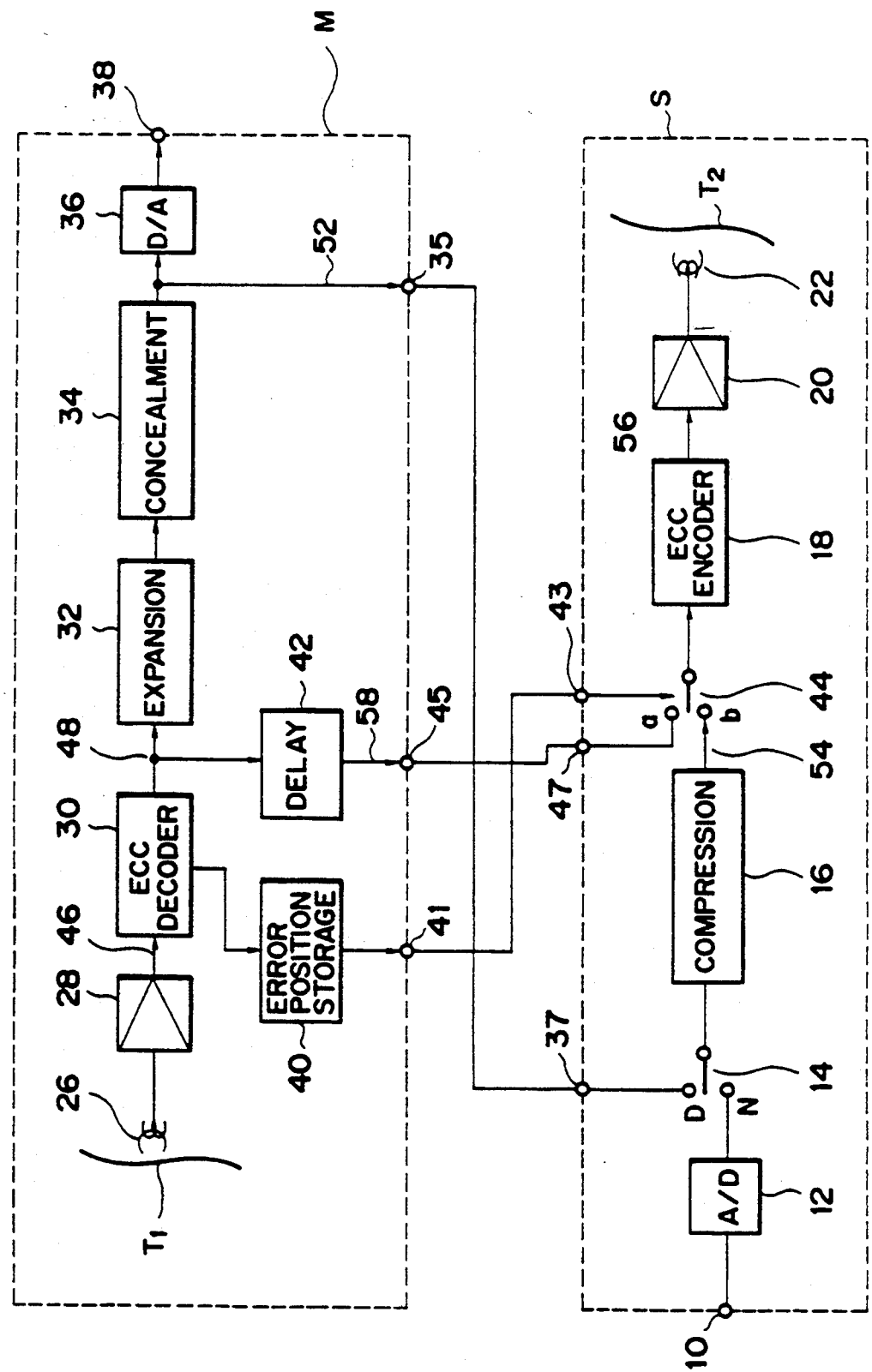
FIG. 2 is a block diagram showing the structure of a dubbing system according to an embodiment of this invention.

FIG. 2 is a block diagram showing the structure of a dubbing system according to an embodiment of this invention. In FIG. 2, similar constituent elements to those shown in FIG. 1 are represented by using identical reference numerals. Also in FIG. 2, only the reproducing system of the master VTR (M) and the recording system of the slave VTR (S) are shown.

An ECC decoder 30 supplies a flag to an error position storage circuit 40, the flag representing whether or not an error code is not correctable. The circuit 40 stores the position, in each data frame, of an uncorrectable error code. At the time when a concealment circuit 34 outputs the uncorrectable error code, i.e., a concealed code, the circuit 40 supplies a flag data representative of the concealed code to a terminal 41. Reference numeral 42 represents a delay circuit having a predetermined delay time to be described later, the delay circuit outputting a delayed and compressed information code train to a terminal 45.

A switch 44 selectively applies to an ECC encoder 18 either a code train delayed by the delay circuit 42 and inputted via a terminal 47, or a code train outputted from a compression encoding circuit 16. The switch 44 is controlled by the flag data supplied from the error position storage circuit 40 and inputted via a terminal 43.

The operations of ordinary recording and reproducing are the same as FIG. 1. The operation of dubbing will be mainly described below. Figs. 3A to 3E are schematic diagrams showing code trains at various circuit portions of FIG. 2. In Figs. 3A to 3E, Di (i=1to n) represents a data, Pi represents a parity check bit, EDi represents a data having an error code left after error correction by the ECC encoder 30, and Fi represents an error flag representative of whether each code after error correction is valid or not.

The error flag Fi is a data which becomes "1" when the corrected code data Di has a code error left (uncorrectable), and "0" when there is no code error left (completely corrected or there is no code error). In FIGS. 3A to 3E, it is assumed that the data $D_2$ has an uncorrected error code corrected, and that code errors, if any, of other code data have been completely corrected by the ECC encoder 30.

FIG. 3A shows a code train inputted to the ECC decoder 30 at the first dubbing. Specifically, the code train includes a predetermined symbol number of codes Di (i=1to n) and a predetermined symbol number of parities Pi. For example, in a Read Solomon (36, 32) system, 4 symbol parity check bits are added to a 32 symbol code train to allow 2 symbol code errors to be corrected.

Figs 3B schematically shows a code train 48 outputted from the ECC decoder 30. A code error of the code data $D_1$ is corrected using the parity $P_1$, and at the same time when the next code data $D_2$ is inputted to the ECC decoder 30. Strictly speaking, it is necessary to consider the error correction decoding time. However, it is not essential in this embodiment, so it is neglected), the corrected code data $D_1$ and the following error flag $F_1$ representative of a presence or absence of a code error are outputted. Since a code error of the code data $D_1$ is not left the error flag $F_1$is "0".

With respect to the code data $D_2$, the ECC decoder 30 is unable to correct all code errors. Therefore, a code data $ED_2$ including a code error is outputted with the error flag $F_2$ of "1". Code errors, if any, of the code data $D_3$ to $D_n$ are completely corrected, so the error flags $F_3$ to $F_n$are all "0".

FIG. 3C shows a code train 54 outputted from the compression encoding circuit 16. This code train signal 54 is obtained such that an output 48 of the ECC decoder 30 passes through the expansion circuit 32, concealment circuit 34, and compression encoding circuit 16, thereby being expanded, concealed, and again compressed. A suffix a is added to data $D_2$to indicate concealment by the concealment circuit 34. Namely, the code data $ED_2$ having a code error changes to the concealed code data $D_{2a}$. An output 54 of the compression encoding circuit 16 is delayed from an output of the ECC decoder 30 by a time $\tau$ which corresponds to the process time by the expansion circuit 32, concealment circuit 34, and compression encoding circuit 16. The delay time of the delay circuit 42 is set to this time $\tau$. FIG. 3D shows an output signal 58 of the delay circuit 42.

The error position storage circuit 40 stores the error flag Fi set to "1" (in the embodiment, $F_2$), and selects the b contact of the switch 44 at the timing when the code data Di corresponding to the stored flag Fi (in this embodiment, $D_2$) is outputted to the terminals 35 and 45. More particularly, for the code data whose error code was not correctable by the ECC decoder 30, the switch 44 selects via the b contact the code data concealed by the concealment circuit 34 and again compressed by the compression encoding circuit 16. For the code data having no code error after it is outputted from the ECC decoder 30, the switch 44 selects via the a contact the compressed information code data time-adjusted by the delay circuit 42 and having no code error.

FIG. 3E shows a code train selected in the above manner (an output of the ECC encoder 18). The ECC encoder 18 adds a parity $P_{2a}$ different from the original parity $P_2$ to the concealed code data $D_{2a}$. It is apparent that the other code data $D_1$, $D_3$ to $D_n$ are added with the original parities $P_1$, $P_3$ to $P_n$, The time difference T between the code train 58 (FIG. 3D) and the code train 56 (FIG. 3E) corresponds to the process time of the ECC encoder 18.

As described above, according to this embodiment, if a code data to be dubbed has no uncorrectable code error, the bandwidth compressed code data is dubbed. Only when a code error is left, the code data is dubbed through expansion, concealment, and second compression. Therefore, image deterioration caused by repetitive bandwidth compressions can be minimized.

Figure 4:
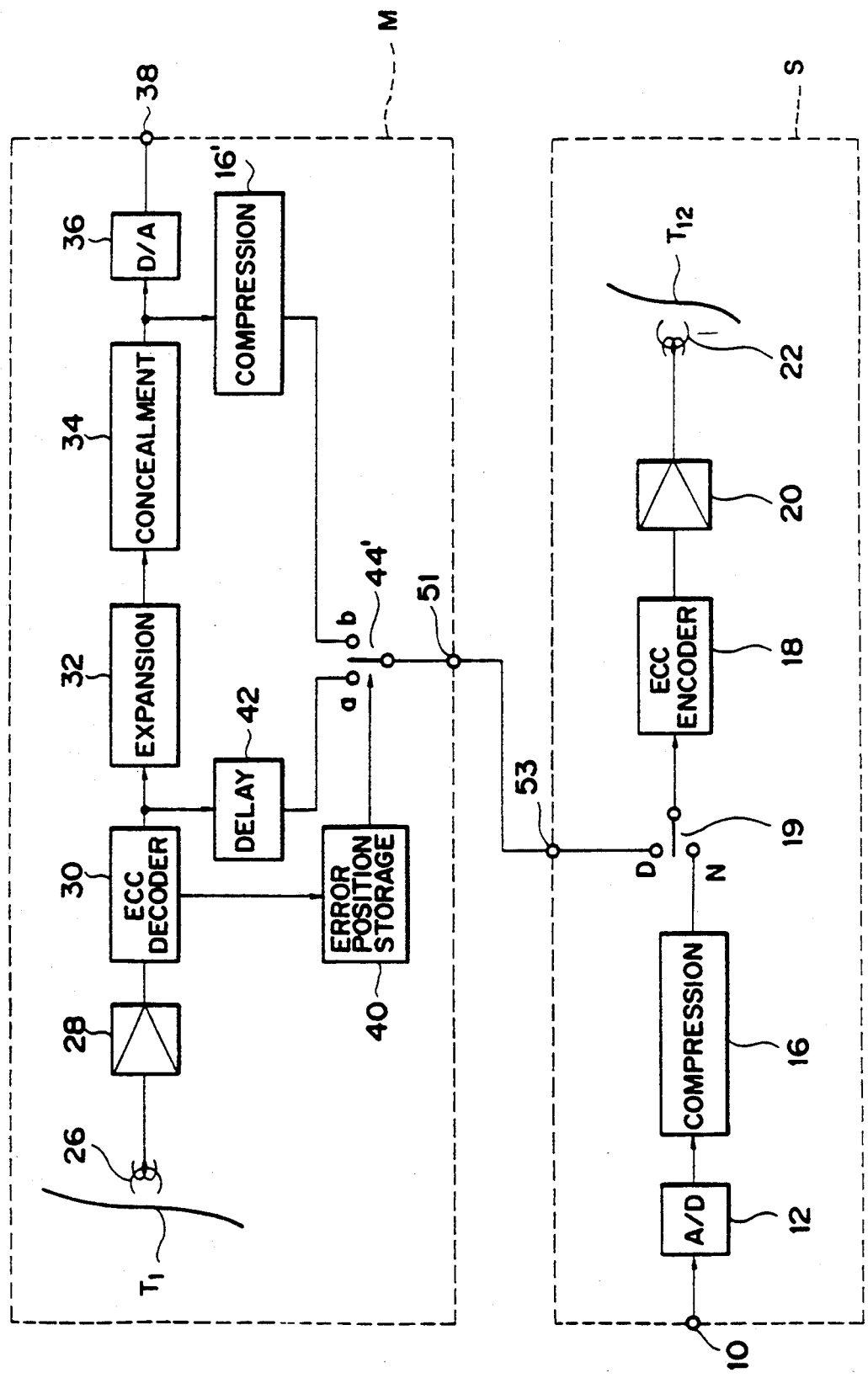
FIG. 4 is a block diagram showing the structure of a dubbing system according to another embodiment of this invention.

FIG. 4 is a block diagram showing the structure of a dubbing system according to another embodiment of this invention. In FIG. 4, similar elements having the same functions to those shown in FIG. 2 are represented by using identical reference numerals. As seen from FIG. 4, in the embodied system, there are provided within the master VTR (M) a compression encoding circuit 16' for compressing and encoding an output of a concealment circuit 34 and a switch 44' controlled by the flag data outputted from the error position storage circuit 40. In this embodiment, a dubbing code train is obtained through the switch 44' instead of the switch 44 of the system shown in FIG. 2.

A code train from the switch 44' is inputted via an output terminal 51 to an input terminal 53 of the slave VTR (S). During dubbing, instead of recording a code train outputted from the compression circuit 16 via the switch 19, a code train from the input terminal 53 is recorded. With such an arrangement, the same advantageous effects as the system shown in FIG. 2 can be obtained. In the embodied system, it is advantageous in that the number of connection lines between the master VTR (M) and the slave VTR (S) is smaller than the system shown in FIG. 2.

In the above description, a magnetic tape has been used as a recording medium. Obviously this invention is applicable to a recording and reproducing apparatus using various recording mediums such as optical disks, optomagnetic disks, and solid memories. Further, such a recording medium may be considered as a transmission line including a communication line between communication satellites. This invention is therefore applicable to repeaters with the same advantageous effects.

As easily understood from the foregoing description, the dubbing system of this invention provides a dubbing with less information deterioration, while positively using the features of digital recording and reproducing apparatus as much as possible.

What is claimed is:

1. An information processing apparatus, comprising:
   (a) input means for inputting a compressed information code train, said compressed information code train having been compressed in information amount by compression encoding and adding an error correction check code;
   (b) error correction means for correcting a code error in said compressed information code train by using said error correction check code;
   (c) decoding means for performing decoding corresponding to said compression encoding on said compressed information code train outputted from said error correction means;
   (d) producing means for producing a produced code corresponding to an information code which is included in an information code train outputted from said decoding means and is uncorrectable by said error correction means;
   (e) a first output terminal for outputting said compressed information code train inputted to said decoding means;
   (f) a second output terminal for outputting an information code train including the produced outputted from said producing means; and
   (g) a third output terminal for converting said information code train including the produced code outputted from said producing means into analog data and outputting said analog data.

2. An apparatus according to claim 1, wherein said input means includes reproducing means for reproducing said compressed information code train from a recording medium.

3. An apparatus according to claim 1, further comprising delay means for delaying said compressed information code train to be inputted into said decoding means, for a predetermined time.

4. An apparatus according to claim 3, wherein said predetermined time is determined according to a time required for processing by said decoding means and said producing means.

5. An apparatus according to claim 1, further comprising a fourth output terminal for outputting a flag indicating whether there is information that is uncorrectable by said error correction means.

6. An information processing apparatus, comprising:
   (a) input means for inputting a compressed information code train, said compressed information code train having been compressed in information amount by compression encoding and adding an error correction check code;
   (b) error correction means for correcting a code error in said compressed information code train by using said error correction code;
   (c) decoding means for performing decoding corresponding to said compression encoding on said compressed information code train outputted from said error correction means;
   (d) producing means for producing a produced code corresponding to an information code which is included in an information code train outputted from said decoding means and is uncorrectable by said error correction means;
   (e) first output means for selectively outputting said compressed information code train to be inputted into said decoding means or an information code train including the produced code outputted from said producing means, to an external unit; and
   (f) second output means for converting said information code train outputted from said producing means into analog data and outputting said analog data.

7. An apparatus according to claim 6, wherein said input means includes reproducing means for reproducing said compressed information code train from a recording medium.

8. An apparatus according to claim 6, further comprising delay means for delaying said compressed information code train to be inputted into said decoding means, for a predetermined time.

9. An apparatus according to claim 6, wherein said first output means is controlled according to a flag indicating whether there is uncorrectable information in said compressed information code train outputted from said error correction means.

10. An information processing apparatus, comprising:
    (a) first input means for inputting a compressed information code train compressed by compression encoding; from a source;
    (b) second input means for inputting an information code train on which said compression encoding has not yet been performed;

(c) third input means for inputting analog information data;

(d) conversion means for performing conversion on said analog information data inputted by said third input means to provide an information code corresponding to said information code train;

(e) compression means for performing compression encoding on an information code train outputted from said conversion means or said information code train outputted from said second input means; and (f) error correction encoding means for performing encoding for error correction on a compressed code train compressed by said compression means or said compressed code train inputted by said first input means.

11. An apparatus according to claim 10, further comprising output means for selectively outputting said compressed information code train outputted from said compression means or said compressed information code train inputted by said first input means.

12. An apparatus according to claim 11, further comprising fourth input means for inputting a flag indicating whether there is uncorrectable information in said compressed information code train inputted by said first input means.

13. An apparatus according to claim 12, wherein said output means is controlled according to said flag inputted by said fourth input means.

14. An information processing apparatus, comprising:
(a) compression means for providing a compressed information code train by compression encoding of information data;
(b) error correction encoding means for performing encoding for error correction on a compressed code train;
(c) a flag input terminal for inputting a flag indicating error correction information;
(d) an input for terminal for inputting a compressed information code train compressed by compression encoding; and
(e) output means for selectively outputting said compressed information code train provided by said compression means or said compressed information code train inputted by said input terminal, to said error correction means according to an output of said flag input terminal.

15. An apparatus according to claim 14, further comprising recording means for recording a compressed code train outputted from said error correction means.

16. An information processing apparatus comprising:
(a) input means for inputting a compressed information code train, said compressed information code train having been compressed in information amount by compression encoding and adding an error correction check code;
(b) error correction means for correcting a using code error in said compressed information code train by said error correction code;
(c) decoding means for performing decoding corresponding to said compression encoding on said compressed information code train outputted from said error correction means;
(d) producing means for producing a produced code corresponding to an information code which is included in an information code train outputted from said decoding means and is uncorrectable by said error correcting means;
(e) first output means for outputting said compressed information code train to be inputted to said decoding means and a flag indicating uncorrectable information in said compressed information code train; to an external unit; and
(f) second output means for converting an information code train including the produced code outputted from said producing means into analog data and outputting said analog data.

17. An apparatus according to claim 16, wherein said input means includes reproducing means for reproducing said compressed information code train from a recording medium.

18. An apparatus according to claim 16, wherein said first output means can output said information code outputted by said producing means.

* * * * *

UNITED STATES PATENT AND TRADEMARK OFFICE
CERTIFICATE OF CORRECTION

PATENT NO. : 5,440,432

DATED : August 8, 1995

INVENTOR(S): AKIO AOKI

Page 1 of 2

It is certified that error appears in the above-identified patent and that said Letters Patent is hereby corrected as shown below:

COLUMN 1

Line 9, "Nov. 20, 1993." should read --Nov. 30, 1993.--.

COLUMN 3

Line 58, "encoder 30," should read --decoder 30,--.

Line 66, "code corrected," should read --code,--.

Line 68, "encoder 30." should read --decoder 30.--.

COLUMN 4

Line 9, "Figs. 3B" should read --FIG. 3B--.

Line 13, "Strictly" should read --(Strictly--.

Line 19, "left" should read --left,--.

Line 32, "$D_2$to" should read --$D_2$ to--.

COLUMN 5

Line 67, "produced" should read --produced code--.

UNITED STATES PATENT AND TRADEMARK OFFICE
CERTIFICATE OF CORRECTION

PATENT NO. : 5,440,432

DATED : August 8, 1995

INVENTOR(S): AKIO AOKI

It is certified that error appears in the above-identified patent and that said Letters Patent is hereby corrected as shown below:

<u>COLUMN 6</u>

Line 29, "correction" should read --correction check--.

Line 65, "coding;" should read --coding,--.

Line 68, "performed;" should read --performed, from the source;--.

<u>COLUMN 8</u>

Line 14, "using" should be deleted.

Line 15, "by" should read --by using--.

Line 29, "train;" should read --train,--.

Signed and Sealed this

Twenty-third Day of January, 1996

Attest:

*Attesting Officer*

BRUCE LEHMAN

*Commissioner of Patents and Trademarks*